United States Patent
Huang et al.

(10) Patent No.: US 8,761,776 B2
(45) Date of Patent: Jun. 24, 2014

(54) CELL RESELECTION METHOD AND TERMINAL

(75) Inventors: Yada Huang, Shenzhen (CN); Zhongda Du, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 275 days.

(21) Appl. No.: 13/062,080

(22) PCT Filed: Apr. 14, 2009

(86) PCT No.: PCT/CN2009/071266
§ 371 (c)(1),
(2), (4) Date: Mar. 3, 2011

(87) PCT Pub. No.: WO2010/031258
PCT Pub. Date: Mar. 25, 2010

(65) Prior Publication Data
US 2011/0165909 A1    Jul. 7, 2011

(30) Foreign Application Priority Data
Sep. 19, 2008    (CN) .......................... 2008 1 0211571

(51) Int. Cl.
*H04W 36/00*    (2009.01)

(52) U.S. Cl.
USPC ........... 455/444; 455/433; 455/434; 455/436; 455/437; 455/438; 455/439; 455/440; 455/441; 455/442; 455/443

(58) Field of Classification Search
CPC ..... H04W 48/16; H04W 48/20; H04W 48/18; H04W 36/30; H04W 36/14; H04W 36/08; H04W 36/04
USPC ......................................... 455/433, 434, 444
See application file for complete search history.

(56) References Cited

U.S. PATENT DOCUMENTS 6,510,146 B1    1/2003    Korpela et al.
7,433,698 B2 *  10/2008   Marjelund et al. ............ 455/462
(Continued)

FOREIGN PATENT DOCUMENTS

CN    1261510 A    7/2000
CN    1512695 A    7/2004
(Continued)

OTHER PUBLICATIONS

International Search Report in international application No. PCT/CN2009/071266, mailed on Jul. 23, 2009.
(Continued)

*Primary Examiner* — Liton Miah
(74) *Attorney, Agent, or Firm* — Knobbe, Martens, Olsen & Bear, LLP

(57) ABSTRACT

The present invention provides a cell reselection method and terminal. The method includes: cells on multiple frequencies with the same priority are set as same-priority cells. The terminal comprises: a first reselection module, used to select cells on multiple frequencies with the same priority according to a priority-based reselection principle when a terminal performs cell reselection, wherein the cells on multiple frequencies with the same priority are same-priority cells; a second reselection module, used to select a cell as a reselected cell from the same-priority cells based on a best-cell reselection principle. The above technical solution enables the terminal to perform cell reselection quickly in a determined manner, and enables configuration of network parameters to achieve the intended purpose.

3 Claims, 2 Drawing Sheets

(56) References Cited

U.S. PATENT DOCUMENTS

| | | | |
|---|---|---|---|
| 7,587,204 B2 * | 9/2009 | Lundell et al. | 455/436 |
| 7,949,337 B2 * | 5/2011 | Choi | 455/440 |
| 8,000,706 B2 * | 8/2011 | Lee et al. | 455/435.2 |
| 8,125,956 B2 * | 2/2012 | Reddy et al. | 370/331 |
| 2005/0079870 A1 | 4/2005 | Rick et al. | |
| 2008/0049681 A1 * | 2/2008 | Koo et al. | 370/332 |
| 2008/0102847 A1 * | 5/2008 | Kim et al. | 455/450 |
| 2008/0188228 A1 * | 8/2008 | Pecen et al. | 455/449 |
| 2008/0261600 A1 * | 10/2008 | Somasundaram et al. | 455/436 |
| 2008/0311900 A1 * | 12/2008 | Pica et al. | 455/423 |
| 2009/0088160 A1 * | 4/2009 | Pani et al. | 455/436 |

FOREIGN PATENT DOCUMENTS

| | | |
|---|---|---|
| CN | 1518367 A | 8/2004 |
| JP | 2003348648 A | 12/2003 |
| JP | 2005012429 A | 1/2005 |
| JP | 2006060671 A | 3/2006 |
| JP | 2006100992 A | 4/2006 |
| JP | 2006222845 A | 8/2006 |
| JP | 2007-043754 A | 2/2007 |
| KR | 10-0681549 B1 | 2/2007 |
| RU | 233814 C2 | 8/2008 |
| WO | 2006032215 A1 | 3/2006 |
| WO | 2008061459 A1 | 5/2008 |

OTHER PUBLICATIONS

Written Opinion in international application No. PCT/CN2009/071266, mailed on Jul. 23, 2009.

Huawei, "Cell Reslection to an equal priority layer", 3GPP TSG, R2-082208, vol. RAN WG2, 4 pages, Kansas City, USA, May 5-9, 2008.

Nokia Corporation et al., "Equal priority Inter-RAT reselection", 3GPP TSG, R2-081053, vol. RAN2, 3 pages, Sorrento, Italy, Feb. 11-15, 2008.

Nokia Corporation et al., "Equal priority RATs", 3GPP TSG, R2-082589, vol. RAN2, 3 pages, Kansas City, USA: Mar. 31-Apr. 4, 2008.

Nokia et al., "E-UTRA Cell Selection and Cell Reselection Aspects", 3GPP TSG, R2-074051, vol. RAN WG2, 12 pages, Shanghai, China, Oct. 8-12, 2007.

NTT Docomo, Inc., "Inter-frequency/RAT cell reselection criteria", 3GPP TSG, R2-080447, vol. RAN WG2, 3 pages, Seville, Spain, Jan. 14-18, 2008.

ZTE, "Several Clarification for Cell Reselection", 3GPP TSG, R2-085352, RAN WG2, 4 pages, Prague, Czech Republic; Sep. 29-Oct. 3, 2008.

Extended European Search Report dated Feb. 29, 2012 of corresponding European Patent Application No. 09813979.3—8 pages.

* cited by examiner

CELL RESELECTION METHOD AND TERMINAL

TECHNICAL FIELD

The present invention relates to the field of communications, particularly to a cell reselection method and terminal.

BACKGROUND

At present, cell handover and reselection performed by a terminal is an important technique in a cellular mobile communication system. Specifically, when a user equipment (UE) leaves a cell and enters another one, a signal received from the original cell by the UE will become weaker, while a signal received from the cell that the UE is entering will get stronger. In order to maintain the quality of the signal received by the UE, the UE will transfer from the original base station to the new base station with a stronger signal.

With regard to a terminal in a connected state, this transfer between base stations is called handover. With regard to a terminal in an idle state, the change of a cell where the terminal camps is implemented via a cell reselection process, so it is necessary for the terminal to detect a target cell and perform cell reselection among the cells that meet requirements.

In a 3rd Generation (3G) mobile communication system, a terminal measures the quality of signals in different cells and compares the quality of the measured signals with the quality threshold of the signal in the serving cell. If the quality of a measured signal continuously meets the reselection standard within a specific time, the terminal will perform cell reselection and transfer to the cell with such signal quality.

Specifically, when the terminal performs cell reselection, it is required to measure the signal level or signal quality of its serving cell and neighbouring cells, then map the measured value of this serving cell into a cell reselection assessment value Rs, and map the measured value of a neighbouring cell into Rn. The Rs is compared with each Rn, and the cell ranked first is the cell with the best signal quality. When the best cell is not the cell where the terminal currently camps, the terminal will perform reselection and transfer to the best cell. Wherein the method of calculating Rs and Rn is determined by standard specifications. Parameters relating to calculation are distributed to the terminal via a broadcast channel of the serving cell.

An evolved universal terrestrial radio access network (E-UTRAN) system in a 3G mobile communication long term evolution (LTE) system continues to use the foregoing cell reselection method to perform intra-frequency cell reselection. Specifically, the terminal is required to calculate Rs=Qmeas,s+Qhysts, Rn=Qmeas,n−Qoffset, wherein s stands for a serving cell, n stands for a neighbouring cell, Qmeas,s stands for a measured level of a serving cell, Qmeas,n stands for a measured level of a neighbouring cell, Qhysts stands for the hysteresis of a serving cell, and Qoffset stands for a level offset of a neighbouring cell. After the calculation is completed, the terminal will rank all R values. The one ranked first is the best cell, the terminal will select the best cell when performing reselection. However, considering that the difficulty of reselection among neighbouring cells lies on not only the radio quality of these cells but also on the value of Qoffset, the foregoing reselection method through ranking R values is also called an offset-based cell reselection method.

As it is necessary to measure all intra-frequency and inter-frequency neighbouring cells when the offset-based cell reselection method is adopted, the terminal will consume more electric energy. As inter-frequency measurement requires the terminal to switch the resonant frequency of a receiver, whereas intra-frequency measurement does not need so, the LTE groups all neighbouring cells by frequency. The terminal firstly ranks the frequencies based on their absolute priority and finds out the frequency with top priority, and then selects a cell on this frequency by the offset-based cell reselection method. This reselection method is called a priority-based reselection method, and the selected cell should meet the following conditions: $S_{nonServingCell,x}$ of a cell on a measured frequency is greater than a threshold value $Thresh_{x,high}$ within $Treselection_{RAT}$, wherein x stands for the measured frequency, nonServingCell stands for the measured cell, $S_{nonServingCell,x}$ stands for the measured level of the measured cell, $Treselection_{RAT}$ stands for the measured time of cell reselection, and $Thresh_{x,high}$ stands for the threshold of reselection to a frequency with higher priority. A cell may be chosen as a reselected cell only when it meets the foregoing conditions. Moreover, the following should be noted when a cell is selected as a reselected cell:

1. if a cell on a frequency with higher priority meets the foregoing conditions and the terminal has camped in a serving cell for more than one second, then the terminal will perform reselection and transfer to this cell;

2. if no reselectable cell exist on the serving frequency or on the frequencies having the same priority with the serving frequency, and no cell on the frequencies with higher priority meets the foregoing conditions, moreover, the measured level $S_{ServingCell}$ of the serving cell is lower than a threshold $Thresh_{serving,low}$, when $S_{nonServingCell,x}$ of a cell on a measured frequency with lower priority is greater than a threshold $Thresh_{x,low}$ within $Treselection_{RAT}$, then the terminal will perform reselection and transfer to this cell, wherein x stands for the measured frequency with lower priority, $S_{nonServingCell,x}$ stands for the measured level of the measured cell, $Treselection_{RAT}$ stands for the measured time of cell reselection, $Thresh_{serving,low}$ stands for the low-level threshold of the serving cell, and $Thresh_{x,low}$ stands for the threshold of reselection to a frequency with lower priority;

3. the offset-based cell reselection method is adopted for reselection among intra-frequency cells and cells on the frequencies with the same priority;

4. when multiple cells on a frequency meet the foregoing conditions, the terminal will select the best cell as the reselected target cell.

It can be seen from the above description that in related techniques, the priority-based reselection method only defines that a terminal can select the best cell by the offset-based cell reselection method (R value-based sequencing method) on condition that this reselection is performed among cells on the same frequency. However, for this case that several cells on each of frequencies with the same priority meet the reselection conditions of the priority-based reselection method, no effective solution has been provided on how to perform cell reselection among these cells.

SUMMARY

The present invention is provided to solve the problem on how to perform cell reselection among cells when several cells on each of frequencies with the same priority meet the reselection conditions. Therefore, the main object of the present invention is to provide a cell reselection method and terminal to solve the foregoing problem existing in related techniques.

According to one aspect of the present invention, a cell reselection method is provided, by which a terminal performs reselection among cells on multiple frequencies with the same priority.

The cell reselection method provided according to the present invention includes: setting the cells on multiple frequencies with the same priority as same-priority cells.

Further, when a terminal performs cell reselection, it may select cells on multiple frequencies with the same priority according to a priority-based reselection principle; and the terminal may select a cell as a reselected cell from among the same-priority cells based on a best-cell reselection principle.

Wherein the same-priority cells may specifically include one of the following: cells on multiple frequencies with the same priority that is higher than the priority of a serving frequency; cells on multiple frequencies with the same priority that is lower than the priority of the serving frequency; a serving cell; and cells on the serving frequency and on one or more frequencies having the same priority with the serving frequency.

Wherein the priority of the same-priority cells may be equal to the absolute priority of corresponding frequencies.

Wherein the best-cell reselection principle may be an offset-based cell reselection principle.

According to another aspect of the present invention, a terminal is provided, which is used to perform reselection among cells on multiple frequencies with the same priority.

The terminal provided according to the present invention comprises: a first reselection module, used to select cells on multiple frequencies with the same priority according to a priority-based reselection principle when a terminal performs cell reselection, wherein the cells on multiple frequencies with the same priority are same-priority cells; a second reselection module, used to select a cell as a reselected cell from among the same-priority cells based on a best-cell reselection principle.

Wherein the same-priority cells may specifically include one of the following: cells on multiple frequencies with the same priority that is higher than the priority of a serving frequency; cells on multiple frequencies with the same priority that is lower than the priority of the serving frequency; a serving cell; and cells on the serving frequency and on one or more frequencies having the same priority with the serving frequency.

Wherein the priority of the same-priority cells may be equal to the absolute priority of corresponding frequencies.

Wherein the first reselection module may be specifically used to select cells on frequencies with higher priority based on the priority of frequencies.

Wherein the best-cell reselection principle may be an offset-based cell reselection principle.

Through selecting the best cell after the cells on multiple frequencies with the same priority are selected, the technical solution of the present invention enables the terminal to perform cell reselection quickly in a determined manner, and enables configuration of network parameters to achieve the intended purpose.

Other characteristics and advantages of the present invention will be illustrated in the subsequent description, and partially become obvious through the description or understood through implementation of the present invention. The object and other advantages of the present invention may be realized and acquired through the structures particularly indicated in the description, claims and drawings.

BRIEF DESCRIPTION OF THE DRAWINGS

The drawings described here are intended to provide further understanding on the present invention and constitute a part of this application. The schematic embodiments of the present invention and the descriptions thereof are intended to explain the present invention and not to limit the present invention. Among the drawings.

DETAILED DESCRIPTION

Function Summary

At present, in related techniques, the priority-based reselection method only defines a cell reselection method for the cells on the same frequency, while it does not define a cell reselection method in the situation that several cells on each of frequencies with the same priority meet the priority-based reselection conditions. Therefore, to solve this problem, the present invention provides a technical solution for cell reselection, wherein cells on multiple frequencies with the same priority are set as same-priority cells. Further, when a terminal performs cell reselection, firstly it will select the cells on one or more frequencies with the same priority according to a priority-based reselection principle and then it will select a cell as a reselected cell from among the same-priority cells based on a best-cell reselection principle.

The preferred embodiments of the present invention are described below in combination with the accompanying drawings. It should be understood that the preferred embodiments described here are only intended to illustrate and explain the present invention and not to limit the present invention. If there is no conflict, the embodiments of the present invention and the features in the embodiments may be combined.

Method Embodiment

Figure 1:
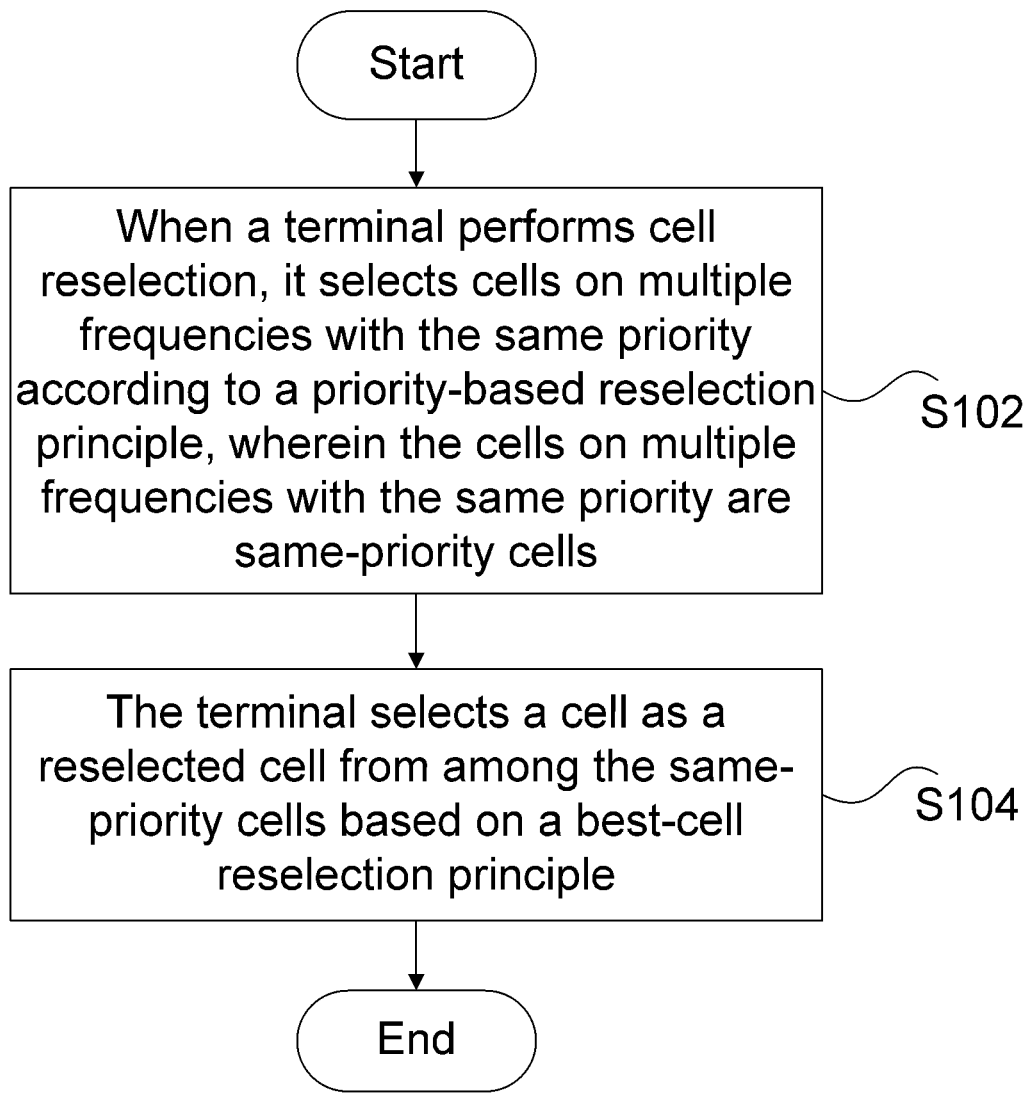
FIG. 1 is a flowchart of a cell reselection method according to an embodiment of the present invention.

According to an embodiment of the present invention, a cell reselection method is provided, by which a terminal performs reselection among cells on multiple frequencies with the same priority. FIG. 1 is a flowchart of a cell reselection method according to an embodiment of the present invention. As shown in FIG. 1, the following processing is included.

Step S102, when a terminal performs cell reselection, it selects cells on multiple frequencies with the same priority according to a priority-based reselection principle, wherein the cells on multiple frequencies with the same priority are same-priority cells.

In Step S102, selecting same-priority cells according to the priority-based reselection principle refers to that: the terminal may first select the cells on the frequencies with higher priority according to the priority of frequencies.

Further, in practical application, the same-priority cells may be cells on multiple frequencies with the same priority that is higher than the priority of the serving frequency, or cells on multiple frequencies with the same priority that is lower than the priority of the serving frequency, or the serving cell, or cells on the serving frequency or on one or more frequencies having the same priority with the serving frequency. Further, the priority of the same-priority cells is equal to the absolute priority of the corresponding frequencies.

Step S104, the terminal selects a cell as a reselected cell from among the same-priority cells based on a best-cell reselection principle, wherein the best-cell reselection principle is an offset-based cell reselection principle (the offset-based cell reselection principle has been described in details in the background of the present invention, so it will not be described here again).

The foregoing technical solution of the present invention will be described in details in combination with examples.

EXAMPLE 1

Reselection to Frequencies with Higher Priority

Frequencies F_a1 and F_a2 are high-priority frequencies with the same priority. C_a1_1 and C_a1_2 are cells on a frequency F_a1, and C_a2_1 is a cell on a frequency F_a2. Currently the terminal resides on a frequency F_b1, and the priority of F_b1 is lower than the priority of F_a1 and F_a2. C_b1_1 is the cell where the terminal resides.

The terminal periodically measures different-frequency cells C_a1_1, C_a1_2 and C_a2_1. If within a time period $Treselection_{E\_UTRAN}$, different-frequency cells satisfy $S_{C\_a1\_1,F\_a1}>Thresh_{F\_a1,high}$, $S_{C\_a1\_2,F\_a1}>Thresh_{F\_a1,high}$ and $S_{C\_a2\_1,F\_a2}>Thresh_{F\_a2,high}$, in other words, three cells with higher priority simultaneously meet the reselection conditions (the reselection conditions: $S_{nonServingCell,x}$ of a cell on a measured frequency is greater than $Thresh_{x,high}$ within $Treselection_{RAT}$), then the terminal needs to reselect and transfer to one of the three cells by the priority-based reselection method, wherein C_a1_1, C_a1_2 and C_a2_1 are same-priority cells; according to the offset-based cell reselection principle, $R_{C\_a1\_1}$, $R_{C\_a1\_2}$ and $R_{C\_a2\_1}$ are ranked after being calculated, in this case, $R_{C\_a1\_2}$ is the largest, then C_a1_2 is the best cell, and the terminal will finally reselect and transfer to the cell C_a1_2.

Through the foregoing processing, the terminal realizes cell reselection to frequencies with higher priority according to the method specified in the present invention.

EXAMPLE 2

Reselection to Frequencies with Lower Priority

Frequencies F_c1 and F_c2 are low-priority frequencies with the same priority. C_c1_1 is a cell on the frequency F_c1, and C_c2_1 is a cell on the frequency F_c2. Currently the terminal resides on a frequency F_b1. The priority of F_b1 is higher than the priority of F_c1 and F_c2. C_b1_1 is a serving cell. F_b2 is a frequency having the same priority with the serving frequency, and C_b2_1 is a cell on this frequency. When $S_{C\_b1\_1}$ is lower than a threshold $Thresh_{C\_b1\_1,low}$, C_b2_1 does not satisfy reselection conditions.

As there is no frequency with priority higher than the priority of F_b1 here, the terminal needs to consider performing reselection among low-priority frequencies F_c1 and F_c2. When $S_{C\_c1\_1,F\_c1}>Thresh_{F\_c1,low}$ and $S_{C\_c2\_1,F\_c2}>Thresh_{F\_c2,low}$ are satisfied within a time period $Treselection_{E\_UTRAN}$, in other words, two low-priority cells simultaneously meet the reselection conditions, then the terminal needs to reselect and transfer to one of the two cells according to the priority-based reselection method. C_c1_1 and C_c2_1 are same-priority cells; according to the offset-based cell reselection principle, $R_{C\_c1\_1}$ and $R_{C\_c2\_1}$ are calculated and ranked, in this case, $R_{C\_c1\_1}$ is the largest, then C_c1_1 is the best cell, and the terminal will finally reselect and transfer to the cell C_c1_1.

Through the foregoing processing, the terminal realizes cell reselection to frequencies with lower priority according to the method specified in the present invention.

Device Embodiment

According to an embodiment of the present invention, a terminal is provided, which is used to perform reselection among cells on multiple frequencies with the same priority. The device may be used to realize the cell reselection method provided by the foregoing method embodiment.

Figure 2:
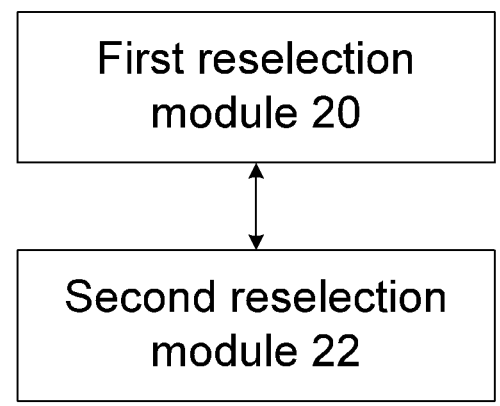
FIG. 2 is a block diagram of a terminal according to an embodiment of the present invention.

FIG. 2 is a block diagram of a terminal according to an embodiment of the present invention. As shown in FIG. 2, the terminal comprises a first reselection module 20 and a second reselection module 22. In practical application, the first reselection module 20 and the second reselection module 22 may also be integrated, but in this embodiment, they are disposed separately in order to more clearly explain the technical solution of the present invention. Below the two modules will be described in details.

The first reselection module 20 is used to select cells on multiple frequencies with the same priority according to a priority-based reselection principle when a terminal performs cell reselection, wherein the cells on multiple frequencies with the same priority are same-priority cells;

Wherein selecting same-priority cells according to a priority-based reselection principle refers to that: the first reselection module 20 may select cells on multiple frequencies with the same priority according to the priority-based reselection method.

Further, in practical application, the same-priority cells may be cells on multiple frequencies with the same priority that is higher than the priority of the serving frequency, or cells on multiple frequencies with the same priority that is lower than the priority of the serving frequency, or the serving cell, or cells on the serving frequency or on one or more frequencies having the same priority with the serving frequency. Further, the priority of the same-priority cells is equal to the absolute priority of the corresponding frequencies.

The second reselection module 22, connected to the first reselection module 20, is used to select a cell as a reselected cell based on a best-cell reselection principle from among the same-priority cells selected by the first reselection module 20. Wherein the best-cell reselection principle is an offset-based cell reselection principle (the offset-based cell reselection principle has been described in details in the background of the present invention, so it will not be described here again).

To summarize, through selecting the best cell after the cells on one or multiple frequencies with the same priority are selected, the technical solution of the present invention solves the problem on how to perform cell reselection among cells meeting reselection conditions on multiple frequencies with the same priority, thereby enabling the terminal to perform cell reselection quickly in a determined manner, and making configuration of network parameters achieve the intended purpose.

The foregoing descriptions are preferred embodiments of the present invention and are not intended to limit the present invention. For those skilled in the art, the present invention may have various changes and modifications. All modifications, equivalent substitutions and improvements, etc, made without departing from the spirit and principle of the present invention, shall be within the protection scope of the present invention.

The invention claimed is:

1. A cell reselection method, by which a terminal, which is currently associated with a serving cell on a serving frequency with a first priority, performs reselection among cells on multiple frequencies, other than the serving frequency, with a second priority, the method including:
   setting the cells on multiple frequencies with the second priority as same-priority cells;
   selecting cells on multiple frequencies with the second priority according to a priority-based reselection principle when a terminal performs cell reselection; and selecting a cell as a reselected cell by the terminal from among the same-priority cells based on a best-cell reselection principle, wherein the same-priority cells include one of the following:
- cells on multiple frequencies with the second priority that is higher than the first priority;
- cells on multiple frequencies with the second priority that is lower than the first priority; and
- a serving cell, and cells on the serving frequency and on one or more frequencies having the same priority with the serving frequency, wherein the priority of the same-priority cells is equal to the absolute priority of corresponding frequencies, and wherein the best-cell reselection principle is an offset-based cell reselection principle.

2. A terminal used to perform reselection among cells on multiple frequencies with the same priority, wherein the terminal is currently associated with a serving cell on a serving frequency with a first priority, the terminal including:
- a first reselection module, used to select cells on multiple frequencies, other than the serving frequency, with a second priority according to a priority-based reselection principle when a terminal performs cell reselection;

wherein the cells on multiple frequencies with the second priority are same-priority cells; and
- a second reselection module, used to select a cell as a reselected cell from among the same-priority cells based on a best-cell reselection principle, wherein the same-priority cells specifically include one of the following:
- cells on multiple frequencies with the second priority that is higher than the first priority;
- cells on multiple frequencies with the second priority that is lower than the first priority; and
- a serving cell, and cells on the serving frequency and on one or more frequencies having the same priority with the serving frequency, wherein the priority of the same-priority cells is equal to the absolute priority of corresponding frequencies, and wherein the best-cell reselection principle is an offset-based cell reselection principle.

3. The terminal according to claim 2, wherein the first reselection module is specifically used to select cells on frequencies with higher priority based on the priority of frequencies.

* * * * *